United States Patent [19]
Hayashi

[11] Patent Number: 5,284,670
[45] Date of Patent: Feb. 8, 1994

[54] METHOD FOR STRETCHING DOUGH

[75] Inventor: Torahiko Hayashi, Utsunomiya, Japan

[73] Assignee: Rheon Automatic Machinery Co., Ltd., Utsunomiya, Japan

[21] Appl. No.: 4,482

[22] Filed: Jan. 12, 1993

Related U.S. Application Data

[63] Continuation of Ser. No. 815,540, Dec. 26, 1991, abandoned, which is a continuation of Ser. No. 547,655, Jul. 3, 1990, abandoned.

Foreign Application Priority Data

Jul. 8, 1989 [JP] Japan ................................ 1-176655

[51] Int. Cl.$^5$ .................................................. A21D 6/00
[52] U.S. Cl. ................................... 426/502; 425/141; 425/149; 425/335; 425/363; 425/367; 425/373; 426/496
[58] Field of Search ............... 426/502, 496; 425/363, 425/367, 373, 141, 149, 335

[56] References Cited

U.S. PATENT DOCUMENTS

| | | | |
|---|---|---|---|
| 2,735,379 | 2/1956 | Stiles | 107/12 |
| 3,191,553 | 6/1965 | Rich et al. | 425/373 |
| 3,593,676 | 7/1971 | Reid | 425/335 |
| 4,266,923 | 5/1981 | Curns | 425/356 |
| 4,276,317 | 6/1981 | Hayashi | 426/502 |
| 4,692,110 | 9/1987 | Hayashi | 425/367 |
| 4,731,008 | 3/1988 | Hayashi et al. | 425/335 |

FOREIGN PATENT DOCUMENTS 211669 2/1987 European Pat. Off. .
386988 9/1990 European Pat. Off. .

Primary Examiner—Helen F. Pratt
Attorney, Agent, or Firm—Guy W. Shoup; Patrick T. Bever

[57] ABSTRACT

A method and apparatus for stretching dough is provided, by which bread dough or confectionery dough is continuously and smoothly stretched by linearly reciprocating a roller over the surface of the part of the dough that is continuously conveyed by a downstream conveyor of a pair of conveyors, one a downstream conveyor and other an upstream conveyor, while the roller rolls on the dough, without destroying the gluten tissue of the dough, and while determining the conveying speed of the upstream conveyor in response to the change of the thickness of the dough to be stretched, thereby obtaining, in one operation, a desired and uniform dough thickness from the continuously supplied dough material.

2 Claims, 5 Drawing Sheets

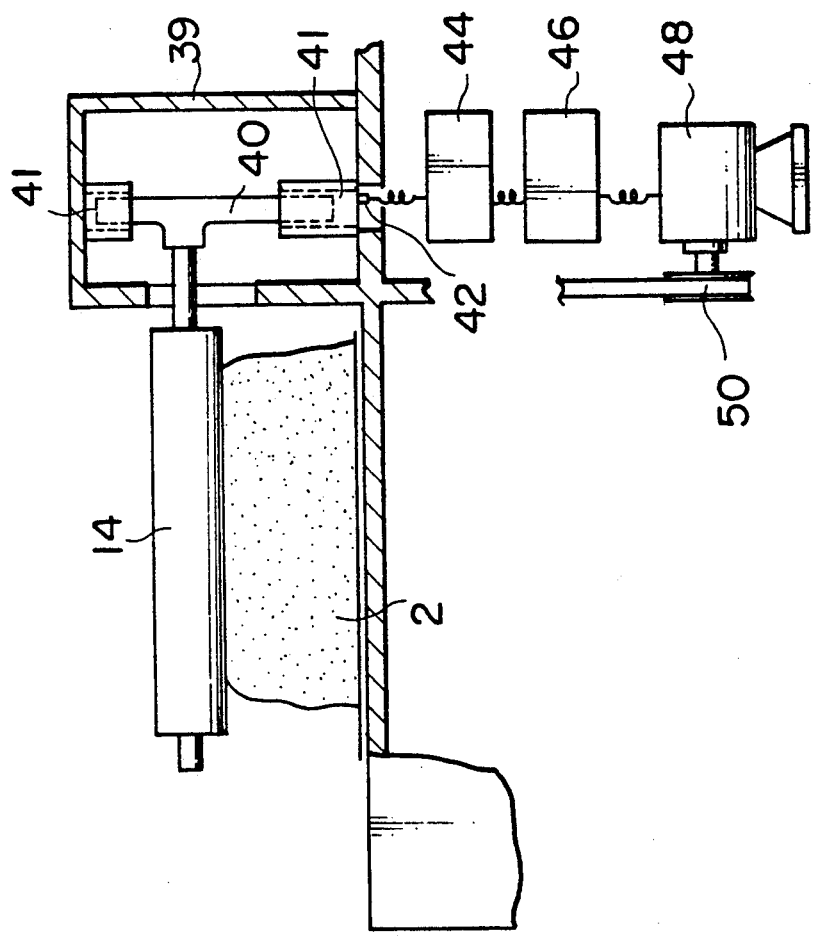

METHOD FOR STRETCHING DOUGH

This application is a continuation of application Ser. No. 07/815,540, filed Dec. 26, 1991 now abandoned which is a continuation of Ser. No. 547,655 filed Jul. 3, 1990, also abandoned.

BACKGROUND OF THE INVENTION

1. Field of Invention

This invention relates to a method and apparatus for stretching plastic material, and, more particularly, to a method and apparatus for stretching dough for bread or confectionery.

2. Description of Prior Art

Plastic materials or dough for bread or confectionery have been continuously stretched by various types of stretchers.

U.S. Pat. No. 4,192,636 discloses an apparatus for stretching dough in which a plurality of serially disposed conveyors, each being driven at a different speed, is arranged. A roller mechanism is disposed above these conveyors. It comprises a plurality of rollers that are freely rotatable about their axes. They constitute an endless elliptical path having a straight part spaced apart from and located over the serially disposed part of the conveyors. Also, U.S. Pat. No. 4,692,110 discloses an apparatus for stretching dough in which a plurality of conveyors, each being driven at a different speed, are serially disposed. In it a roller mechanism, comprising a plurality of rollers that are freely rotatable about their axes, and that constitute a straight path, are spaced apart from and located over the serially disposed portion of the conveyors. Since in these prior apparatuses the conveying speed of the downstream conveyor is higher than that of the upstream conveyor, and the dough being conveyed by the serially disposed conveyors is gently held by the rollers that are advancing downstream or reciprocating over the surface of the dough, it is smoothly stretched.

However, the roller mechanism has a heavy and complex structure, so that it requires high production, maintenance, and repair costs. Therefore, an apparatus for stretching dough that is simple, functions steadily, and that has low production costs, has been desired.

Therefore, this invention provides a method and apparatus for stretching dough in which two serially disposed conveyors, and a roller that is rotatable about its axis and that is reciprocated over a downstream conveyor, are arranged. According to this invention dough is first stretched by the effect of the different speeds of the two conveyors. It first becomes dough with a roughly stretched and uneven surface. The surface of this roughly stretched dough is then made smooth and further stretched by the rotation of the roller on the surface of the dough. Thus, the dough can be smoothly stretched by the apparatus of this invention, as in the prior art apparatuses.

It has been accepted that to stretch dough that has a height (H) to produce a dough strip that would have the same thickness as the distance (D) between the roller and the conveying surface of the downstream conveyor, the following formula should be met in the stretching operation:

$$V_1/V_2 = D/H$$

wherein ($V_1$) represents the conveying speed of the upstream conveyor, and ($V_2$) represents the conveying speed of the downstream conveyor.

According to the apparatus of this invention, dough is effectively stretched when the above formula is met.

Since in this invention only a means for reciprocating the roller is provided, other than the roller and a pair of conveyors, the structure of the apparatus is simple.

It is therefore an object of this invention to provide a method of stretching dough in which a roller is reciprocated over the surface of the dough being continuously conveyed by a downstream conveyor that is disposed serially with an upstream conveyor, while the roller is rotated on the surface of the dough. The dough is first stretched when it is transferred from the upstream conveyor to the downstream conveyor, and then the roughly stretched dough, which has a smooth surface, is further stretched by the roller located above the downstream conveyor. Since the dough being conveyed by the downstream conveyor is uniformly compressed by the roller that is repeatedly reciprocating over the surface of the dough, the gluten tissue of the dough does not suffer any excessive compression from the roller, and thus the dough is effectively and uniformly stretched.

Another object of this invention is to provide an apparatus for working the above-mentioned method. It comprises an upstream conveyor, a downstream conveyor that is disposed serially with the upstream conveyor, the conveying speed of said downstream conveyor being higher than that of the upstream conveyor, a roller rotatable about its axis and located above the downstream conveyor, and means for reciprocating the roller by a predetermined distance (1) along a moving path spaced apart from the conveying surface of the downstream conveyor. Since the apparatus of this invention only requires means for reciprocating the roller, other than a roller and a pair of conveyors, the structure of the apparatus is simple. This leads to low production costs in making the structure.

BRIEF DESCRIPTION OF THE DRAWINGS

FIG. 5 is a schematic elevational view, partly in section, illustrating means for determining the ratio of $V_1/V_2$ of the first and second embodiments of this invention.

PREFERRED EMBODIMENTS OF THE INVENTION

Figure 1:
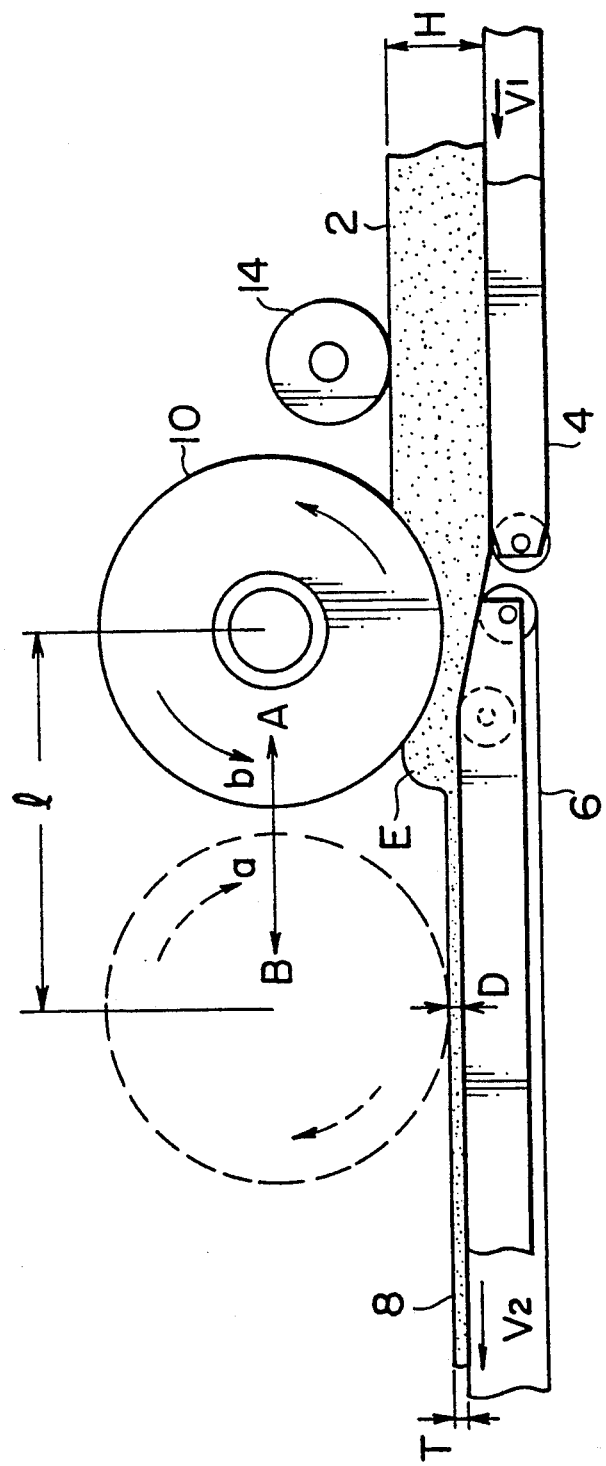
FIG. 1 is a schematic side-elevational view, partly in section, illustrating the first embodiment of this invention.
Figure 2:
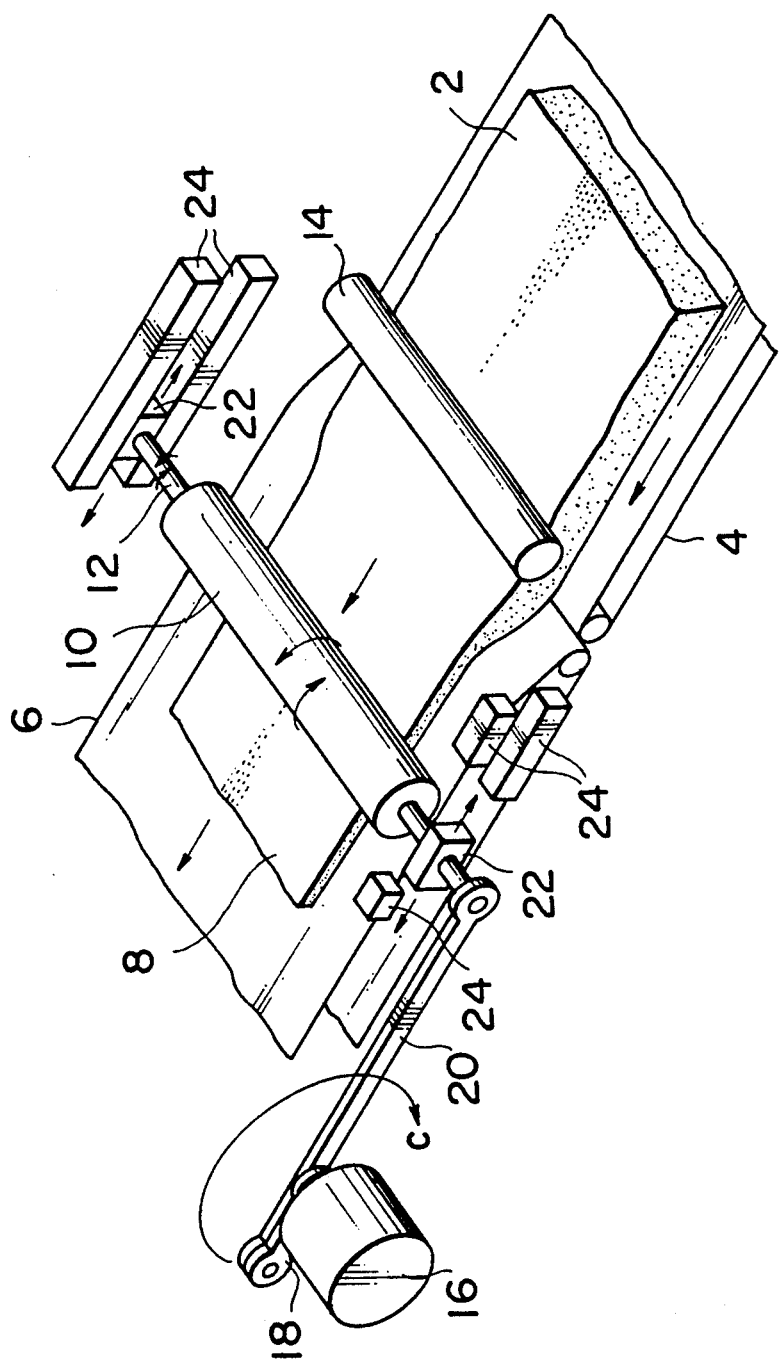
FIG. 2 is a schematic perspective view, partly in section and cutaway, illustrating the first embodiment of this invention.

The first embodiment of this invention will now be described by reference to the drawings. In FIGS. 1 and 2 an upstream conveyor (4) that is driven at speed ($V_1$), a downstream conveyor (6) that is driven at speed ($V_2$) that is higher than the speed ($V_1$), a roller (10), and a level sensing roller (14), are arranged. The roller (10) is provided with a shaft (12), about which the roller is freely rotated by bearing means (not shown) mounted on the shaft (12). The roller (10) may be rotated by the rolling contact with the surface of the dough when it is moved by the downstream conveyor (6). A motor (16) is arranged adjacent the downstream conveyor (6) and mounted to a frame (not shown). One end of a crank (18) is connected to the shaft of the motor (16) and the other end of the crank (18) is connected to one end of a crank rod (20) by a pin. The other end of the crank rod (20) is pivotally connected to one end of the shaft (12). Sliders (22,22) are fixedly mounted to the shaft (12), each being adjacent either end of the shaft (12). Guides (24,24 . . . ), partly cut away in FIG. 2, are mounted to the frame such that both sliders (22,22) can slide within slots formed by the respective pairs of guides (24,24 . . . ) arranged side-by-side. The sliders (22,22) allow the shaft (12) to reciprocate within the slots in accordance with the reciprocating movement of the crank rod (20), and also allow the shaft (12) to be rotated in the sliders (22,22) by bearing means (not shown) mounted within the sliders (22,22).

In FIG. 5, the shaft of the level sensing roller (14) is mounted to a bracket (40) that is adapted to move up and down within recesses (41,41) that are mounted to a frame (39). The level sensing roller (14) moves up and down in response to the change of the height (H) of the dough (2), while rolling on its surface to transmit height information to a height signal generating means (42). The level sensing roller (14), the bracket (40), and the height signal generating means (42), all compose a sensor (14,40,42) for detecting the height (H) of the dough (2). The height signal generating means (42) generates height information signals and sends them to an arithmetic unit (44) in which the height information signals are converted into signals for changing the frequency of an electrical source to be supplied to a motor (48). These signals are sent to an inverter (46). In the inverter (46) the frequency is changed to a frequency that changes the output of the motor (48) that drives the upstream conveyor (4) through a belt (50).

When the motor (16) is energized, the crank (18) is rotated to reciprocate the crank rod (20). The roller (10) is reciprocated over a distance (l). This is a reciprocating stroke. A distance (D) is kept between the roller (10) and the conveying surface of the downstream conveyor (6). The distance (D) can be adjusted to a desired value by an adjusting means (not shown). Dough (2) that has a height (H) is conveyed from the upstream conveyor (4) to the downstream conveyor (6).

There is provided a difference in speed between the upstream conveyor (4) that is driven at speed ($V_1$) and the downstream conveyor (6) that is driven at speed ($V_2$) such that the ratio of the speed of the upstream conveyor (4) to the speed of the downstream conveyor (6) is usually set at 1/5 or less. Therefore, the dough is stretched between these conveyors to a substantial degree. The dough transferred onto the downstream conveyor (6) is further stretched by the reciprocating movement of the roller while the surface of the dough is made smooth.

FIG. 1 shows a portion (E) of the dough (2) and the roller (10) where the roller (10) just begins to move in a direction indicated by an arrow (B) and to roll in a direction indicated by an arrow (b). The portion (E) shows the bulge of the dough (2), which instantly occurs when the roller (10) starts moving. Preferably the linear reciprocating speed of the roller is higher than the conveying speed V of the downstream conveyor (6). The reason is that the roller (10) should roll over the surface of the dough, in the direction (b), by the rolling friction with the dough, thereby spreading the dough downstream. Thus, the roller (10), when it is moved in the direction (B), spreads and stretches the portion (E) of the dough (2). When the roller (10) reaches the downstream end of the reciprocating stroke of the roller (10), the distance of which stroke equals(l), it is moved in a direction indicated by an arrow (A), while rolling over the surface of the dough in a direction indicated by an arrow (a). When the roller (10) reaches the upstream end of the reciprocating stroke of the roller (10), it again begins to move in the direction (B), while spreading and stretching the next portion (E) of the dough (2). Thus, the dough (2) is continuously stretched by reciprocating movements of the roller (10) over the distance (l).

Since the dough being conveyed by the downstream conveyor (6) receives uniform compression by the roller (10) that is repeatedly reciprocating over the surface of the dough, the gluten tissue of the dough does not suffer any excessive compression from the roller (10). Thus, the dough (8) is effectively and uniformly stretched. The distance (D) is set at about equal to a thickness (T), which is the desired thickness of the dough (8), or set at somewhat less than the thickness (T).

The dough can be stretched based on the relationship of the height (H) of the dough, the distance (D) between the roller and the conveying surface of a downstream conveyor, the conveying speed ($V_1$) of the upstream conveyor, and the conveying speed ($V_2$) of the downstream conveyor, namely, based on the following formula:

$$V_1/V_2 = D/H$$

Therefore, if the height (H) varies it is necessary for the upstream conveyor to change its conveying speed ($V_1$). As mentioned above, the height (H) is sensed by the level sensing roller (14), and the height information is sent to the arithmetic unit (44) through the height information signal generating means (42). The arithmetic unit (44) computes the ratio $V_1/V_2$, based on the following formula, to automatically determine the speed $V_1$:

$$V_1/V_2 = D/H$$

A signal that indicates the speed $V_1$ is sent from the arithmetic unit (44) to the inverter (46). The inverter (46) changes the frequency of an electrical source for the motor (48) to a frequency that changes the number of rotations of the motor (48) so that the motor (48) causes the upstream conveyor (4) to be driven at a changed speed $V_1$. Therefore, even though the height (H) of the dough (2) supplied from the preceding station varies irregularly, the speed ($V_1$) of the upstream conveyor (4) is automatically determined, so that the desired thickness (T) of the dough (8) can be continuously obtained. When the motor (16) is driven, the crank (18) is rotated to reciprocate the crank rod (20). Thus the roller (10) is reciprocated by a distance (l), while maintaining a distance (D), and while rolling over the surface of the dough, the rolling being caused by friction with the dough.

In this embodiment the operation is carried out under the following conditions:
Speed $V_1$ of the upstream conveyor: about 2 m/min Speed $V_2$ of the downstream conveyor: about 10 m/min
Height (H) of dough to be stretched: about 50 mm
Distance (D) of the gap: about 10 mm
Diameter of the roller (10): about 100 mm
Stroke of the reciprocating movement of the roller (10): about 400 mm
The number of the reciprocating movements of the roller(10): about 150 /min(300 strokes/min)

In this embodiment the formula $V_1/V_2=D/H$, using the above numbers, can be expressed as 2 m/10 m=10 mm/50 mm. The thickness (T) of the dough (8) after stretching was about 10 mm. If the height (H) of the dough to be stretched changes from 50 mm to 40 mm, the formula $V_1/V_2=D/H$ can be expressed as 2.5 m/10 m=10 mm/40 mm. Therefore, the speed $V_1$ of the upstream conveyor is changed to about 2.5 m/min, so that the thickness (T) of the stretched dough (8) is always kept at about 10 mm during the operation.

The number of the reciprocating movements of the roller(10) may be in the range of from about 100 to 200 per minute. The distance of the reciprocating movement of the roller (10) may be in the range of from about 100 mm to 500 mm.

Figure 3:
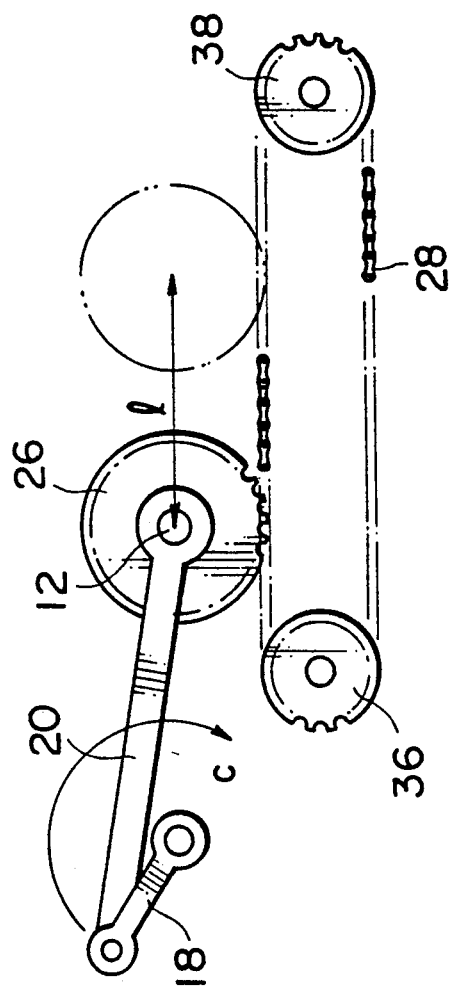
FIG. 3 is a schematic side-elevational view illustrating the second embodiment of this invention.
Figure 4:
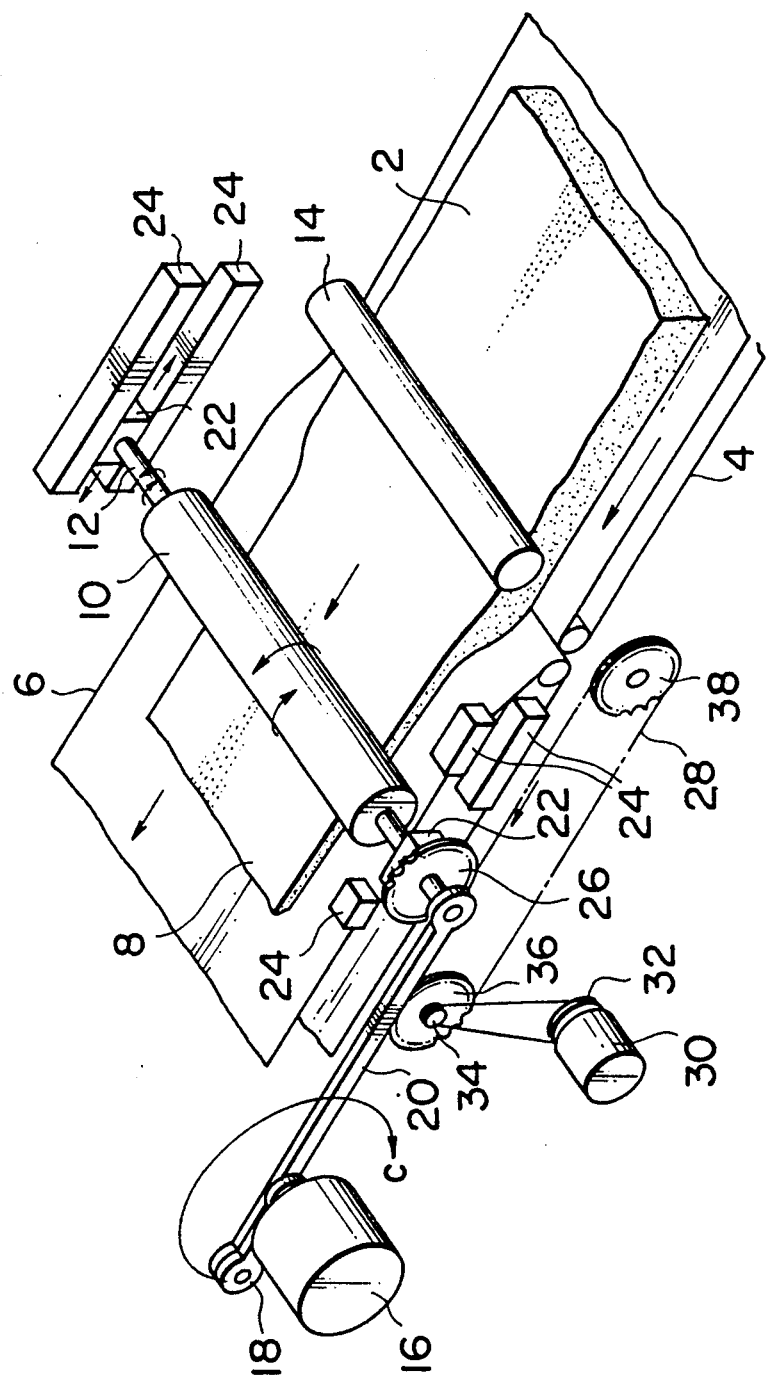
FIG. 4 is a schematic perspective view, partly in section and cutaway, illustrating the second embodiment of this invention.

The second embodiment of this invention will now be described by reference to the drawings. Regarding the upstream conveyor (4), the downstream conveyor (6), the roller (10), the level sensing roller (14), the motor (16), the crank (18), and the crank rod (20), they are all arranged as in the first embodiment. However, the following points are different:

As shown in FIGS. 3 and 4, the roller (10) is fixedly mounted to the shaft (12), and a sprocket (26) is also fixedly mounted to the shaft (12) near one end of it. The pitch circle diameter of the sprocket (26) is usually made to be equal to the diameter of the roller (10). Sprockets (36,38) are arranged near the downstream conveyor (6), and an endless chain (28) is entrained over the sprockets (36,38). The endless chain (28) engages the sprocket (26). The sprocket (36) is driven by a motor (30). The rotational power of the motor (30) is transmitted to the sprocket (36) through a pulley (32), which is mounted to the shaft of the motor (30), a belt entrained over the pulley (32) and a pulley (34), which is mounted to the shaft of the sprocket (36). The endless chain (28) is adapted to move in the same direction as the conveying direction of the downstream conveyor (6), and usually at the same speed as its conveying speed $V_2$.

When the motors (16,30) are energized, the crank rod (20) gives the reciprocating movement to the shaft (12) of the roller (10), and the chain (28) is also moved. The roller (10) is forcibly rotated by the engagement of the sprocket (26) with the chain (28) when the roller (10) is reciprocated. Since the pitch circle diameter of the sprocket (26) and that of the roller (10) are about the same, and the chain (28) is moved in synchronization with the movement of the downstream conveyor (6), the roller (10) rolls on the surface of the dough conveyed by the downstream conveyor, like the roller (10) that rolls by the rolling friction with the dough as in the first embodiment. Since no slipping occurs between the surface of the roller (10) and the surface of the dough, which slipping may occasionally occur in the operation as in the first embodiment, the roller (10) can roll over all of the surface of the dough and stretch it.

The pitch circle diameter of the sprocket (26) may be changed to a somewhat larger or smaller one. If the pitch circle diameter of the sprocket (26) is designed to be smaller than the diameter of the roller (10), in order to have the roller (10) rotate at the same speed as the conveying speed of the conveyor (6), it is necessary for the moving speed of the chain (28) to be reduced. Also, in this embodiment, since the rolling action of the roller is repeated many times, the dough receives uniform compression by the roller (10). Therefore, the gluten tissue of the dough does not receive any excessive compression from the roller (10), unlike in the prior art.

During the operation of this embodiment the speeds $V_1$ and $V_2$, the height (H), the distance (D), the diameter of the roller (10), the stroke of reciprocating movement of the roller (10), and the number of the reciprocating movements of the roller (10) per minute, were the same as in the first embodiment. The moving speed of the endless chain (28) was about 10 mm/min, and dough of a thickness of about 10 mm was continuously obtained.

In this embodiment, where the roller is forcibly rotated in either direction of its movement, a bulge of the dough like the portion (E) appearing in the downstream side of the roller (10) also occasionally occurs in the upstream side of the roller (10), during its movement upstream, or when it reaches the upstream end of its stroke. This bulge can be ordinarily spread when the roller moves downstream. It can be stretched by repeating the reciprocating movement of the roller (10). However, the occurrence of such a bulge of dough can be avoided by applying a tangential force toward the downstream direction by the rotation of the roller (10) onto the surface of the dough. This can be carried out by increasing the linear speed of the endless chain (28) whereby the peripheral speed of the roller (10) is made higher than the conveying speed of the downstream conveyor (6). Thus, any bulge of dough is avoided, or, if it does occur, it is pushed away behind the roller (10) when the roller (10) is so forcibly rotated.

Such a forcible driving of the roller (10) can also be carried out by providing a friction plate (not shown) disposed below the reciprocating path of the roller (10) so as to engage the surface of the roller (10), in place of arranging the endless chain (28) and its related means and the sprocket (26). Also, friction wheels (not shown) that have a diameter smaller, or larger, than the diameter of the roller (10), can be fixedly mounted to the shaft (12) of the roller (10), so that the peripheral speed of the roller (10) can be adjusted.

The peripheral speed of the roller (10) may be made higher than the conveying speed of the downstream conveyor (6) when the roller (10) is moved downstream. In this case the forcible driving of the roller (10) may also be carried out, either by the combination of the chain and the sprocket, or by the combination of the friction plate and the friction wheel.

As described above, by the method of this invention the dough being conveyed by the downstream conveyor receives a uniform compression by the rotation of the roller, which is repeatedly reciprocating over the surface of the dough, and the gluten tissue of the dough does not suffer any excessive compression from the roller. Therefore, the dough is effectively and uniformly stretched, while the dough's elasticity is kept.

Also, since, other than a roller and a pair of conveyors, the apparatus of this invention does not require much more than means for reciprocating the roller, the structure of the apparatus is simple. This results in its low production costs.

I claim:

1. A method of stretching dough comprising:

conveying dough from an upstream conveyor to a downstream conveyor that is disposed serially with said upstream conveyor, the conveying speed of said downstream conveyor being higher than that of said upstream conveyor, reciprocating a single roller such that the roller continuously contacts the surface of the dough being moved on said downstream conveyor, said roller being reciprocated to only contact with surface of the dough on said downstream conveyor, the reciprocating speed of the roller being higher than the conveying speed of said downstream conveyor, and forcibly and directly rotating the roller about its axis at a speed equal to a difference between the conveying speed of the downstream conveyor and the reciprocating speed of the roller.

2. A method of claim 1 further comprising:

measuring a first thickness of the dough on said upstream conveyor; and adjusting the conveying speed of the upstream conveyor to equal the product of a ratio of a distance from said roller to said downstream conveyor divided by said first distance, said ratio being multiplied by said conveying speed of said downstream conveyor.

* * * * *